US011858521B1

United States Patent
Hajiloo et al.

(10) Patent No.: US 11,858,521 B1
(45) Date of Patent: Jan. 2, 2024

(54) VEHICLE MOTION CONTROL SYSTEM USING REAL-TIME TIRE STATE CORRECTION

(71) Applicant: GM Global Technology Operations LLC, Detroit, MI (US)

(72) Inventors: Reza Hajiloo, Richmond Hill (CA); Shamim Mashrouteh, Guelph (CA); Arash Hashemi, Waterloo (CA); Ehsan Asadi, Markham (CA); Seyedeh Asal Nahidi, North York (CA); Seyedalireza Kasaiezadeh Mahabadi, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 18/302,933

(22) Filed: Apr. 19, 2023

(51) Int. Cl.
*B60W 40/12* (2012.01)
*B60W 50/00* (2006.01)
*B60W 30/18* (2012.01)

(52) U.S. Cl.
CPC ...... *B60W 40/12* (2013.01); *B60W 30/18172* (2013.01); *B60W 50/0097* (2013.01); *B60W 2050/0037* (2013.01); *B60W 2510/20* (2013.01); *B60W 2510/22* (2013.01); *B60W 2520/26* (2013.01); *B60W 2520/28* (2013.01); *B60W 2720/403* (2013.01)

(58) Field of Classification Search
CPC ........... B60W 40/12; B60W 30/18172; B60W 50/097; B60W 2050/0037; B60W 2510/027; B60W 2510/022; B60W 2520/26; B60W 2520/28; B60W 2720/403; B60W 2520/10; B60W 2510/20; B60W 10/08; B60W 10/16; B60W 30/18145; B60W 30/188
USPC ........................................ 701/69, 82, 87, 89
See application file for complete search history.

(56) References Cited

U.S. PATENT DOCUMENTS

| | | | |
|---|---|---|---|
| 2017/0369050 A1* | 12/2017 | Varnhagen | B60W 10/184 |
| 2022/0144279 A1* | 5/2022 | Arikere | B60T 8/1761 |
| 2022/0402474 A1* | 12/2022 | Subramanian | B60W 10/119 |
| 2023/0139179 A1* | 5/2023 | Askari | B60W 40/13 |
| | | | 701/1 |

FOREIGN PATENT DOCUMENTS

KR 20170065365 A * 6/2017

* cited by examiner

*Primary Examiner* — Roger L Pang
(74) *Attorney, Agent, or Firm* — Vivacqua Crane PLLC

(57) ABSTRACT

A vehicle motion control system includes one or more input devices for generating one or more input signals associated with data indicative of a motion of the vehicle. The system further includes a computer, which has one or more processors. The computer further includes a non-transitory computer readable storage medium for storing instructions, such that the processor is programmed to compare a current tire state and a current tire prediction model to the data indicative of the motion of the vehicle. The processor is further programmed to calculate in real-time an adjusted tire state and an adjusted tire prediction model. The processor is further programmed to generate in real-time one or more actuation signals based on the adjusted tire state and the adjusted tire prediction model. The actuators in real-time adjust the motion of the vehicle in response to the actuator receiving the actuation signal from the processor.

20 Claims, 2 Drawing Sheets

VEHICLE MOTION CONTROL SYSTEM USING REAL-TIME TIRE STATE CORRECTION

INTRODUCTION

The present disclosure relates to vehicle motion control systems, and more particularly to a vehicle motion control system having a computer for mitigating in real-time inaccurate tire state estimations and tire prediction models for improving vehicle stability.

Automotive manufacturers and suppliers are continuously investigating vehicle motion control systems for improving the stability of vehicles. Vehicle motion control systems include components that influence the longitudinal, lateral, and vertical dynamics of the vehicle. Examples of these components include various components (e.g., steering, brakes, dampers and electronic control units). The conditions of these components can determine the performance of the vehicle motion control systems, and the conditions of these components may deteriorate over their associated life cycles.

Thus, while the current vehicle motion control systems achieve their intended purpose, there is a need for an improved vehicle motion control systems that addresses these issues.

SUMMARY

According to several aspects, a vehicle motion control system is provided for a vehicle. The system includes one or more input devices for generating one or more input signals associated with data indicative of a motion of the vehicle. The system further includes one or more actuators for adjusting the motion of the vehicle. The system further includes a computer attached to the vehicle. The computer includes one or more processors communicating with the input devices and the actuators. The computer further includes a non-transitory computer readable storage medium for storing instructions, such that the processor is programmed to receive the input signals from the input device. The processor is further programmed to determine a current tire state and a current tire prediction model. The processor is further programmed to compare the current tire state and the current tire prediction model to the data indicative of the motion of the vehicle, in response to the processor receiving the input signal. The processor is further programmed to calculate in real-time an adjusted tire state and an adjusted tire prediction model based on the data indicative of the motion of the vehicle, in response to the processor determining that the current tire state and the current tire prediction model are not verified against the data indicative of the motion of the vehicle. The processor is further programmed to generate in real-time one or more actuation signals based on the adjusted tire state and the adjusted tire prediction model. The actuator in real-time adjusts the motion of the vehicle, in response to the actuator receiving the actuation signals from the processor.

In one aspect, the actuators include a first plane actuator transmitting a first torque to a front axle of the vehicle and a second plane actuator transmitting a second torque to a rear axle of the vehicle.

In another aspect, in response to the first and second plane actuators receiving the actuation signals from the processor, the first plane actuator increases the first torque by a predetermined front torque increment, and the second plane actuator deceases the second torque by a predetermined rear torque increment.

In another aspect, the actuators include an Electric All Wheel Drive device and/or an Electric Limited Slip Differential device.

In another aspect, the processor is further programmed to compare a first sign of the current tire state and a second sign of the current tire lateral force to one another. The processor is further programmed to determine a degradation in the current tire state and/or the current tire prediction model, in response to the processor determining that the first and second signs are opposite to one another. The processor is further programmed to calculate in real-time the adjusted tire state and the adjusted tire prediction model, in response to the processor determining the degradation in the current tire prediction model.

In another aspect, the processor is further programmed to determine a decrease in a tire slip ratio of the vehicle, in response to the processor receiving the input signal from the input device. The processor is further programmed to determine an increase in a tire lateral force capacity, in response to the processor determining the increase in the tire slip ratio. The processor is further programmed to determine the degradation in the current tire state and/or the current tire prediction model, in response to the processor determining the increase in the tire lateral force capacity.

In another aspect, the processor is further programmed to determine an increase in a current tire normal force, in response to the processor receiving the input signal from the input device. The processor is further programmed to determine the decrease in the tire lateral force capacity, in response to the processor determining the increase in the current tire normal force.

In another aspect, the processor is further programmed to use an Arbitration logic to calculate the adjusted tire state and the adjusted tire prediction model, in response to the processor determining that the current tire state and the current tire prediction model are not verified against the data indicative of the motion of the vehicle.

In another aspect, the input device includes an Inertial Measurement Unit, a Wheel Angle Sensor, a Suspension Height Sensor, a Global Positioning System, and/or a Wheel Speed Sensor.

In another aspect, the processor is further programmed to determine offline a decrease in the first torque in the front axle for a predetermined period of time below a time threshold. The processor is further programmed to determine offline the degradation in the current tire state and the associated data indicative of the motion of the vehicle, in response to the processor determining the decrease in the first torque in the front axle.

According to several aspects, a computer for a vehicle motion control system for a vehicle. The system includes one or more input devices for generating one or more input signals associated with data indicative of a motion of the vehicle. The system further includes one or more actuators for adjusting the motion of the vehicle, with the computer being attached to the vehicle. The computer includes one or more processors, which communicates with the input device and receives one or more input signals from the input devices. The computer further includes a non-transitory computer readable storage medium for storing instructions, such that the processor is programmed to receive the input signal from the input device. The processor is further programmed to determine a current tire state and a current tire prediction model. The processor is further programmed to compare the current tire state and the current tire prediction model to the data indicative of the motion of the vehicle, in response to the processor receiving the input signal. The processor is further programmed to calculate in real-time an adjusted tire state and an adjusted tire prediction model based on the data indicative of the motion of the vehicle, in response to the processor determining that the current tire state and the current tire prediction model are not verified against the data indicative of the motion of the vehicle. The processor is further programmed to generate in real-time one or more actuation signals based on the adjusted tire state and the adjusted tire prediction model. The actuator in real-time adjusts the motion of the vehicle, in response to the actuator receiving the actuation signal from the processor.

In one aspect, the processor is further programmed to compare a first sign of the current tire state and a second sign of the current tire lateral force to one another. The processor is further programmed to determine a degradation in the current tire state and/or the current tire prediction model, in response to the processor determining that the first and second signs are opposite to one another. The processor is further programmed to calculate in real-time the adjusted tire state and the adjusted tire prediction model, in response to the processor determining the degradation in the current tire prediction model.

In another aspect, the processor is further programmed to determine a decrease in a tire slip ratio of the vehicle, in response to the processor receiving the input signal from the input device. The processor is further programmed to determine an increase in a tire lateral force capacity, in response to the processor determining the increase in the tire slip ratio. The processor is further programmed to determine the degradation in the current tire state and/or the current tire prediction model, in response to the processor determining the increase in the tire lateral force capacity.

In another aspect, the processor is further programmed to determine a increase in a current tire normal force, in response to the processor receiving the input signal from the input device. The processor is further programmed to determine the decrease in the tire lateral force capacity, in response to the processor determining the increase in the current tire normal force.

In another aspect, the processor is further programmed to use an Arbitration logic to calculate the adjusted tire state and the adjusted tire prediction model, in response to the processor determining that the current tire state and the current tire prediction model are not verified against the data indicative of the motion of the vehicle.

In another aspect, the processor is further programmed to determine offline that the first torque in the front axle has decreased for a predetermined period of time below a time threshold. The processor is further programmed to determine offline the degradation in the current tire state and the associated data indicative of the motion of the vehicle, in response to the processor determining the decrease in the first torque in the front axle.

According to several aspects, a method is provided for operating a computer for a vehicle motion control system of a vehicle. The method includes receiving, using one or more processors of the computer, the input signal from one or more input devices. The method further includes determining, using the processor, a current tire state and a current tire prediction model. The method further includes comparing, using the processor, the current tire state and the current tire prediction model to the data indicative of the motion of the vehicle, in response to the processor receiving the input signal. The method further includes calculating in real-time, using the processor, an adjusted tire state and an adjusted tire prediction model based on the data indicative of the motion of the vehicle, in response to the processor determining that the current tire state and the current tire prediction model are not verified against the data indicative of the motion of the vehicle. The method further includes generating, using the processor, in real-time one or more actuation signals based on the adjusted tire state and the adjusted tire prediction model. The actuator in real-time adjusts the motion of the vehicle, in response to the actuator receiving the actuation signal from the processor.

In one aspect, the method further includes comparing, using the processor, a first sign of the current tire state and a second sign of the current tire lateral force to one another. The method further includes determining, using the processor, a degradation in the current tire state and/or the current tire prediction model in response to the processor determining that the first and second signs are opposite to one another. The method further includes calculating in real-time, using the processor, the adjusted tire state and the adjusted tire prediction model, in response to the processor determining the degradation in the current tire prediction model.

In another aspect, the method further includes determining, using the processor, an increase in a tire slip ratio of the vehicle, in response to the processor receiving the input signal from the input device. The method further includes determining, using the processor, an increase in a tire lateral force capacity, in response to the processor determining the increase in the tire slip ratio. The method further includes determining, using the processor, the degradation in the current tire state and/or the current tire prediction model, in response to the processor determining the increase in the tire lateral force capacity.

In another aspect, the method further includes determining, using the processor, an increase in a current tire normal force, in response to the processor receiving the input signal from the input device. The method further includes determining, using the processor, the decrease in the tire lateral force capacity, in response to the processor determining the increase in the current tire normal force.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
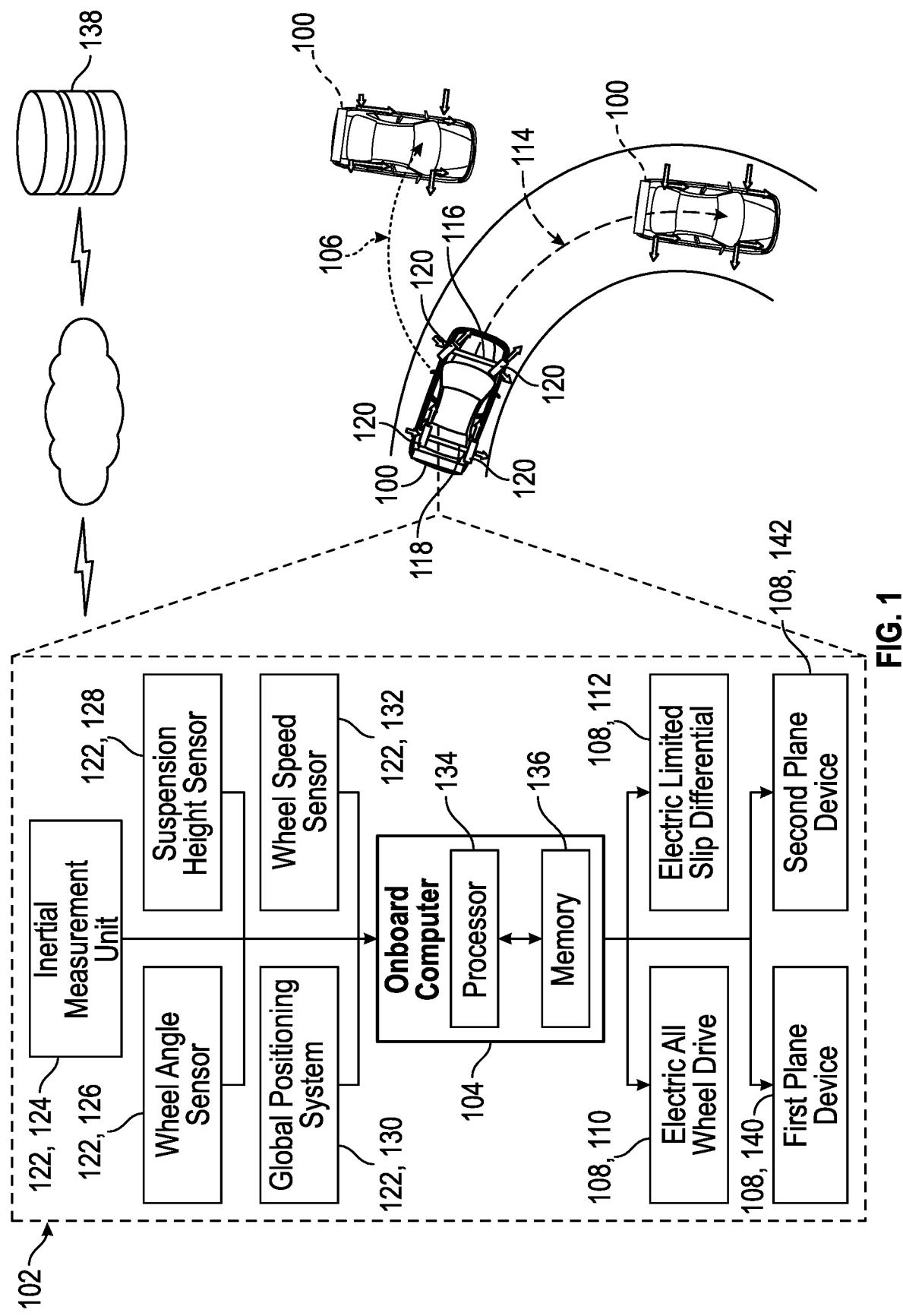
FIG. 1 is a schematic view of one non-limiting example of a vehicle having a vehicle motion control system with a computer for mitigating in real-time degradation of the tire states and the tire prediction models.

Referring to FIG. 1, there is generally illustrated one non-limiting example of a vehicle 100 (e.g., a fully autonomous vehicle, a semi-autonomous vehicle, a fully manual vehicle, etc.) having a vehicle motion control system 102 with a computer 104 that identifies in real-time a degradation of the tire states and the tire prediction models (e.g., inaccurate tire state calculations such as wrong magnitude and/or wrong direction and inaccurate prediction models). These degradations may cause the vehicle 100 to skid, such that the vehicle 100 travels along an unintended path 106. As described in detail below, the real-time detection of degradation permits online mitigation strategies to adjust tire states and associated degraded estimations. As further described below, the adjusted tire states and prediction models permit the system 102 to coordinate limit handling of one or more actuators 108 (e.g., an Electric All Wheel Drive 110 and/or an Electric Limited Slip Differential 112, etc.) to adjust motion of the vehicle 100, such that the vehicle 100 travels along an intended path 114 without skidding. The system 102 coordinates limit handling by the actuators 108 to adjust torque output between front and rear axles 116, 118 of the vehicle 100, which in turn provides a maximum lateral grip for the tires 120 of the vehicle 100.

The system 102 includes one or more input devices 122 for generating one or more input signals associated with data indicative of a motion of the vehicle 100. In this non-limiting example, the input devices 122 include an Inertial Measurement Unit 124, a Wheel Angle Sensor 126, a Suspension Height Sensor 128, a Global Positioning System 130, and a Wheel Speed Sensor 132. The Inertial Measurement Unit 124 may be an electronic device that measures and reports a specific force, an angular rate, and/or an orientation of the vehicle 100, using a combination of accelerometers, gyroscopes, and sometimes magnetometers. In certain non-limiting examples, the Global Positioning System may be an Inertial-Measurement-Unit-enabled device. The Inertial Measurement Unit device may allow a Global Positioning System receiver to function when GPS-signals are unavailable, when the vehicle 100 travels within tunnels, inside buildings, or when electronic interference is present. In other non-limiting examples, the system can include any combination of one or more of these input devices or any other suitable input devices.

The system 102 further includes one or more actuators 108 for adjusting the motion of the vehicle 100. As described in detail below, the actuator 108 in real-time adjusts the motion of the vehicle 100, in response to the actuator 108 receiving an actuation signal from a processor 134. In this non-limiting example, the actuators 108 include a first plane actuator 140 transmitting a first torque to a front axle 116 and a second plane actuator 142 transmitting a second torque to a rear axle of the vehicle 118. Also, in this non-limiting example, the actuators 108 may include the Electric All Wheel Drive 110 and the Electric Limited Slip Differential 112. It is contemplated the system can include other suitable actuators for adjusting the motion of the vehicle.

The system 102 further includes the computer 104 attached to the vehicle 100, with the computer 104 having one or more processors 134 communicating with the input devices 122 (e.g., the Inertial Measurement Unit 124, the Wheel Angle Sensor 126, the Suspension Height Sensor 128, the Global Positioning System 130, the Wheel Speed Sensor 132, etc.) and the actuators 108 (e.g., the Electric All Wheel Drive 110 and/or the Electric Limited Slip Differential 112, etc.). The computer 104 further includes a non-transitory computer readable storage medium 136 for storing instructions, such that the processor 134 is programmed to receive the input signals from the input devices 122 and determine a current tire state and a current tire prediction model. In this non-limiting example, the system 102 may further include a remote server 138 wirelessly communicating with the computer 104, with the remote server 138 performing certain functions of the system and/or including software for updating the computer 104.

The processor 134 is programmed to compare the current tire state and the current tire prediction model to the data indicative of the motion of the vehicle, in response to the processor 134 receiving the input signal. More specifically, in this non-limiting example, the processor 134 is programmed to compare a first sign of the current tire state and a second sign of the current tire lateral force to one another. The processor 134 is further programmed to determine a degradation in the current tire state and/or the current tire prediction model, in response to the processor 134 determining that the first and second signs are opposite to one another.

The processor 134 is programmed to calculate in real-time an adjusted tire state and an adjusted tire prediction model based on the data indicative of the motion of the vehicle, in response to the processor 134 determining that the current tire state and the current tire prediction model are not verified against the data indicative of the motion of the vehicle 100 (i.e., determining a degradation in the current tire state and/or the current tire prediction model). In this non-limiting example, the processor 134 is programmed to use an Arbitration logic to calculate the adjusted tire state and the adjusted tire prediction model, in response to the processor 134 determining that the current tire state and the current tire prediction model are not verified against the data indicative of the motion of the vehicle.

Continuing with the previous non-limiting example, the processor 134 is programmed to determine a increase in a tire slip ratio of the vehicle 100, in response to the processor 134 receiving the input signal from the input device 122. The processor 134 is programmed to determine a increase in a tire lateral force capacity, in response to the processor determining the increase in the tire slip ratio. The processor 134 is further programmed to determine the degradation in the current tire state and/or the current tire prediction model, in response to the processor determining the decrease in the tire lateral force capacity. The processor 134 is programmed to calculate in real-time the adjusted tire state and the adjusted tire prediction model, in response to the processor 134 determining the degradation in the current tire state and/or the current tire prediction model.

The processor 134 is programmed to determine a increase in a current tire normal force, in response to the processor 134 receiving the input signal from the input device 122. The processor 134 is further programmed to determine the decrease in the tire lateral force capacity, in response to the processor 134 determining the decrease in the current tire normal force. The processor 134 is further programmed to determine the degradation in the current tire state and/or the current tire prediction model, in response to the processor 134 determining the decrease in the tire lateral force capacity. The processor 134 is further programmed to calculate in real-time the adjusted tire state and the adjusted tire prediction model, in response to the processor 134 determining the degradation in the current tire state and/or the current tire prediction model.

The processor 134 is programmed to determine offline a decrease in the first torque in the front axle 116 for a predetermined period of time below a time threshold. The processor 134 is further programmed to determine offline the degradation in the current tire state and the associated data indicative of the motion of the vehicle 100, in response to the processor 134 determining the decrease in the first torque in the front axle 116. The processor 134 is programmed to calculate in real-time the adjusted tire state and the adjusted tire prediction model, in response to the processor 134 determining the degradation in the current tire state and/or the current tire prediction model.

The processor 134 is programmed to generate in real-time actuation signal based on the adjusted tire state and the adjusted tire prediction model. In response to actuators 108 (e.g., the first and second plane actuators 140, 142) receiving the actuation signal from the processor 134 (e.g., where the processor determines that the tire state and prediction model have degraded), the first plane actuator 140 increases the first torque by a predetermined front torque increment and the second plane actuator 142 deceases the second torque by a predetermined rear torque increment, such that the system 102 provides the vehicle 100 with a maximum lateral grip to permit the vehicle to travel along an intended path 114 without skidding. Without the system providing the real-time correction of degraded tire state and tire prediction models, the vehicle 100 may skid and travel along the unintended path 106.

Figure 2:
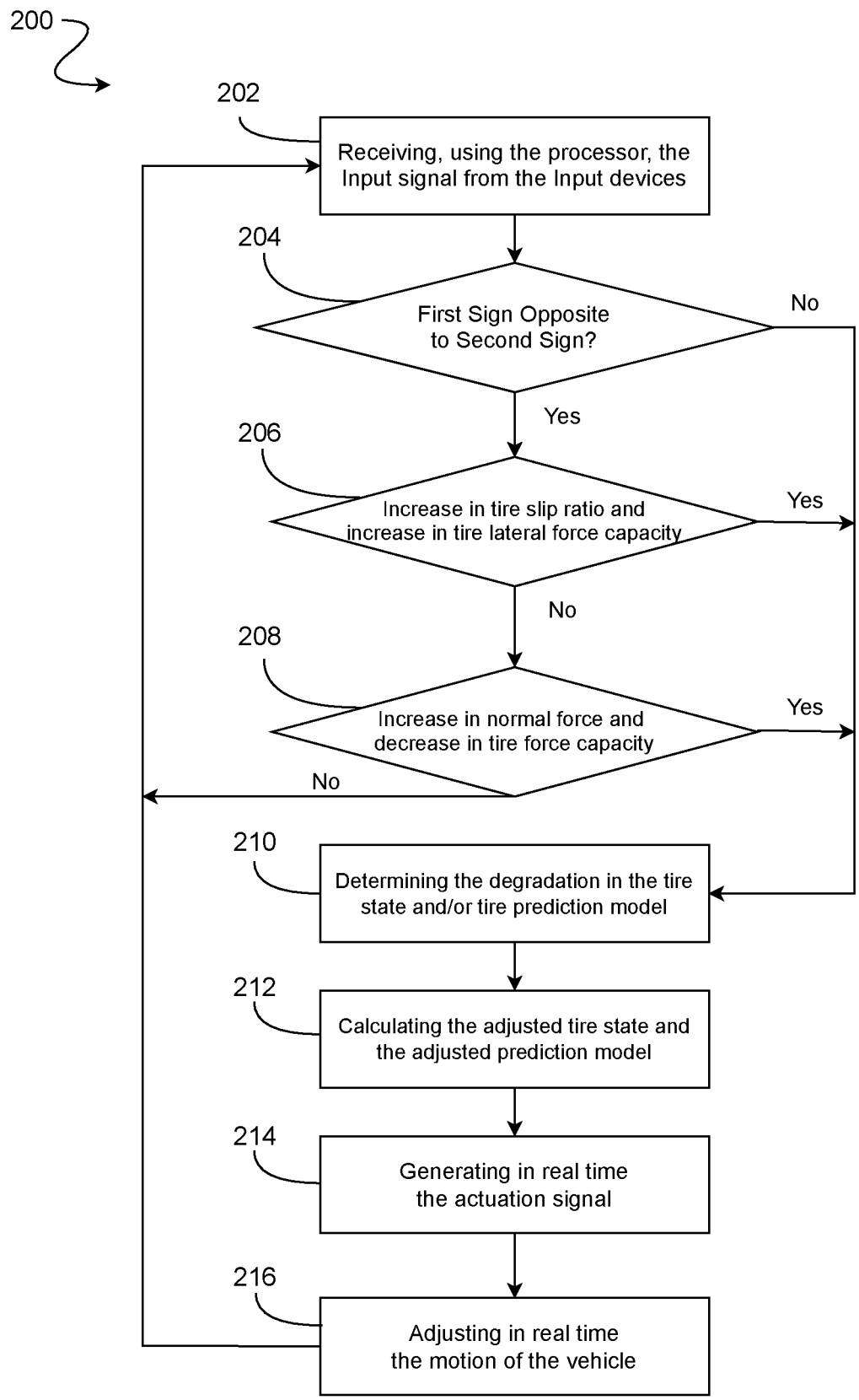
FIG. 2 is a flow chart of one example of a method of operating the vehicle motion control system of FIG. 1.

Referring to FIG. 2, one non-limiting example of a method 200 is provided for operating the computer of the system 102 for the vehicle of FIG. 1. The method 200 begins at block 202 with receiving, using the processor 134 of the computer 104, the input signal from the input devices 122 (e.g., the Inertial Measurement Unit 124, the Wheel Angle Sensor 126, the Suspension Height Sensor 128, the Global Positioning System 130, the Wheel Speed Sensor 132, etc.). The method 200 then proceeds to block 204.

At block 204, the method 200 further includes determining, using the processor 134, the current tire state and the current tire prediction model in response to the processor 134 receiving the input signal from the input devices 122. More specifically, in this non-limiting example, the method 200 includes comparing, using the processor 134, a first sign of the current tire state and the second sign of the current tire lateral force to one another. If the processor 134 does not determine that the first and second signs are opposite to one another, the method 200 proceeds to block 206. If the processor 134 determines that the first and second signs are opposite to one another, the method returns to block 202.

At block 206, the method 200 further includes determining, using the processor 134, the tire slip ratio of the vehicle 100 and the tire lateral force capacity, in response to the processor 134 receiving the input signal from the input device 122. If the processor 134 determines an increase in the tire slip ratio and an increase in the tire lateral force capacity the method 200 proceeds to block 210. If the processor 134 does not determine the increase in the tire slip ratio and tire lateral force capacity, the method 200 proceeds to block 208.

At block 208, the method 200 further includes determining, using the processor 134, the tire normal force and the tire force capacity in response to the processor 134 receiving the input signal from the input device 122. If the processor 134 determines the increase in current tire normal force and decrease in tire force capacity, the method 200 proceeds to block 210. If the processor 134 does not determine the increase in current tire normal force and decrease in tire force capacity, the processor 134 returns to block 202.

At block 210, the method 200 further includes determining, using the processor 134, the degradation in the current tire state and/or the current tire prediction model, in response to the processor 134 determining that the current tire state and the current tire prediction model are not verified against the data indicative of the motion of the vehicle 100 (i.e., determining the degradation in the current tire state and/or the current tire prediction model), in response to the processor 134 determining the increase in the tire lateral force capacity. The method 200 further includes determining, using the processor 134, the degradation in the current tire state and/or the current tire prediction model, in response to the processor 134 determining that the first and second signs are opposite to one another and the processor 134 further determining the increase in the tire lateral force capacity. The method 200 then proceeds to block 212.

At block 212, the method 200 further includes calculating in real-time, using the processor 134, the adjusted tire state and the adjusted tire prediction model based on the data indicative of the motion of the vehicle, in response to the processor 134 determining that the current tire state and the current tire prediction model are not verified against the data indicative of the motion of the vehicle 100 (i.e., determining a degradation in the current tire state and/or the current tire prediction model). In this non-limiting example, the processor 134 is programmed to use an Arbitration logic to calculate the adjusted tire state and the adjusted tire prediction model, in response to the processor 134 determining that the current tire state and the current tire prediction model are not verified against the data indicative of the motion of the vehicle. The method 200 then proceeds to block 214.

At block 214, the method 200 further includes generating in real-time, using the processor 134, the actuation signal based on the adjusted tire state and the adjusted tire prediction model. In response to the actuators 108 (e.g., the first and second plane actuators 140, 142) receiving the associated actuation signals from the processor 134 (e.g., where the processor 134 determines that the tire state and prediction model have degraded), the first plane actuator 140 increases the first torque by a predetermined front torque increment, and the second plane actuator 142 deceases the second torque by a predetermined rear torque increment, such that the method 200 provides the vehicle 100 with a maximum lateral grip to permit the vehicle 100 to travel along an intended path 114 (e.g., without skidding). Without the method providing the real-time correction of degraded tire state and tire prediction models, the vehicle 100 may skid and travel along an unintended path 106. The method 200 then proceeds to block 216.

At block 216, the method 200 further includes adjusting in real-time, using the actuator 108, the motion of the vehicle in response to the actuator 108 receiving the actuation signal from the processor 134. In this non-limiting example, in response to the actuators 108 (e.g., the first and second plane actuators 140, 142) receiving the actuation signal from the processor 134 (e.g., where the processor determines that the tire state and prediction model have degraded), the first plane actuator 140 increases the first torque by a predetermined front torque increment and the second plane actuator 142 deceases the second torque by a predetermined rear torque increment, such that the method 200 provides the vehicle 100 with a maximum lateral grip to permit the vehicle to travel along the intended path 114 spaced from the unintended path 106.

The flow chart provided in the present disclosure illustrate operations implemented by the system according to some exemplary embodiments of the present disclosure. It should be understood that the operations shown in the flow charts may be performed in a different order. The operations may be performed in a different order or performed simultaneously. In addition, one or more other operations can be added to the flow charts, and one or more operations can be removed from the flow charts.

In the present disclosure, the term "autonomous driving vehicle" may refer to a vehicle that has the ability to perceive its environment, and automatically perceive, judge and make decisions based on the external environment without human (e.g., a driver, a pilot, etc.) input and/or intervention. The terms "autonomous driving vehicle" and "vehicle" can be used interchangeably herein.

Moreover, although the system and method provided in the present disclosure mainly describe the vehicle motion control system and method that can be used for autonomous driving, it should be understood that these are only some exemplary embodiments. The system and method of the present disclosure can be applied to any other types of transportation systems. For example, the system and method of the present disclosure may be applied to various transportation systems in different environments, including land, sea, aerospace, etc., or any combination thereof. The autonomous driving vehicles of a transportation system may include, but are not limited to, taxis, private cars, trailers, buses, trains, bullet trains, high-speed railways, subways, ships, airplanes, spacecraft, etc., or any combination thereof. In some exemplary embodiments, the system and method of the present disclosure can find applications in logistics warehouses and military affairs, for example.

In general, the computing systems and/or devices described may employ any of a number of computer operating systems, including, but by no means limited to, versions and/or varieties of the ANDROID AUTOMOTIVE OS developed by GOOGLE INC., the MICROSOFT WINDOWS operating system, the UNIX operating system (e.g., the SOLARIS operating system distributed by ORACLE Corporation of Redwood Shores, California), the AIX UNIX operating system distributed by INTERNATIONAL BUSINESS MACHINES of Armonk, New York, the LINUX operating system, the MAC OSX and iOS operating systems distributed by APPLE INC. of Cupertino, California, the BLACKBERRY OS distributed by BLACKBERRY LTD. of Waterloo, Canada, and the OPEN HANDSET ALLIANCE, or the QNX CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies. Some of these applications may be compiled and executed on a virtual machine. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The non-transitory computer readable medium that participates in providing data (e.g., instructions) may be read by the computer (e.g., by a processor of a computer and may take many forms, including, but not limited to, non-volatile media and volatile media. Non-volatile media may include, for example, optical or magnetic disks and other persistent memory. Volatile media may include, for example, dynamic random-access memory, which typically constitutes a main memory. Such instructions may be transmitted by one or more transmission media, including coaxial cables, copper wire and fiber optics, including the wires that comprise a system bus coupled to a processor of an Engine Control Unit.

Databases, data repositories or other data stores described herein may include various kinds of mechanisms for storing, accessing, and retrieving various kinds of data, including a hierarchical database, a set of files in a file system, an application database in a proprietary format, a relational database management system, etc. Each such data store is generally included within a computing device employing a computer operating system, such as one of those mentioned above, and are accessed via a network in any one or more of a variety of manners. A file system may be accessible from a computer operating system and may include files stored in various formats.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle motion control system for a vehicle, the vehicle motion control system comprising:
   at least one input device for generating at least one input signal associated with data indicative of a motion of the vehicle;
   at least one actuator for adjusting the motion of the vehicle; and
   a computer attached to the vehicle, the computer comprising:
      at least one processor communicating with the at least one input device and the at least one actuator; and
      a non-transitory computer readable storage medium for storing instructions, such that the at least one processor is programmed to:
         receive the at least one input signal from the at least one input device;
         determine a current tire state and a current tire prediction model;
         compare the current tire state and the current tire prediction model to the data indicative of the motion of the vehicle in response to the at least one processor receiving the at least one input signal;
         calculate in real-time an adjusted tire state and an adjusted tire prediction model based on the data indicative of the motion of the vehicle in response to the at least one processor determining that the current tire state and the current tire prediction model are not verified against the data indicative of the motion of the vehicle; and
         generate in real-time at least one actuation signal based on the adjusted tire state and the adjusted tire prediction model; and
      wherein the at least one actuator in real-time adjusts the motion of the vehicle in response to the at least one actuator receiving the at least one actuation signal from the at least one processor.

2. The vehicle motion control system of claim 1 wherein the at least one actuator comprises:
   a first plane actuator transmitting a first torque to a front axle; and
   a second plane actuator transmitting a second torque to a rear axle of the vehicle.

3. The vehicle motion control system of claim 2 wherein, in response to the first and second plane actuators receiving the at least one actuation signal from the at least one processor, the first plane actuator increases the first torque by a predetermined front torque increment and the second plane actuator deceases the second torque by a predetermined rear torque increment.

4. The vehicle motion control system of claim 3 wherein the at least one actuator comprises at least one of an Electric All Wheel Drive device and an Electric Limited Slip Differential device.

5. The vehicle motion control system of claim 4 wherein the at least one processor is further programmed to:
   compare a first sign of the current tire state and a second sign of a current tire lateral force to one another;
   determine a degradation in at least one of the current tire state and the current tire prediction model in response to the at least one processor determining that the first and second signs are opposite to one another; and
   calculate in real-time the adjusted tire state and the adjusted tire prediction model in response to the at least one processor determining the degradation in the current tire prediction model.

6. The vehicle motion control system of claim 5 wherein the at least one processor is further programmed to:
   determine an increase in a tire slip ratio of the vehicle in response to the at least one processor receiving the at least one input signal from the at least one input device;
   determine an increase in a tire lateral force capacity in response to the at least one processor determining the increase in the tire slip ratio; and
   determine the degradation in at least one of the current tire state and the current tire prediction model in response to the at least one processor determining the increase in the tire lateral force capacity.

7. The vehicle motion control system of claim 6 wherein the at least one processor is further programmed to:
   determine an increase in a current tire normal force in response to the at least one processor receiving the at least one input signal from the at least one input device; and
   determine the decrease in the tire lateral force capacity in response to the at least one processor determining the increase in the current tire normal force.

8. The vehicle motion control system of claim 7 wherein the at least one processor is further programmed to use an Arbitration logic to calculate the adjusted tire state and the adjusted tire prediction model in response to the at least one processor determining that the current tire state and the current tire prediction model are not verified against the data indicative of the motion of the vehicle.

9. The vehicle motion control system of claim 8 wherein the at least one input device comprises at least one of an Inertial Measurement Unit, a Wheel Angle Sensor, a Suspension Height Sensor, a Global Positioning System, and a Wheel Speed Sensor.

10. The vehicle motion control system of claim 9 wherein the at least one processor is further programmed to:
    determine offline a decrease in the first torque in the front axle for a predetermined period of time below a time threshold; and
    determine offline the degradation in the current tire state and the associated data indicative of the motion of the vehicle in response to the at least one processor determining the decrease in the first torque in the front axle.

11. A computer for a vehicle motion control system for a vehicle, with the vehicle having at least one input device for generating at least one input signal associated with data indicative of a motion of the vehicle, and at least one actuator for adjusting the motion of the vehicle, with the computer attached to a vehicle, and the computer comprising:
    at least one processor communicating with at least one input device and receiving an input signal from the at least one input device; and
    a non-transitory computer readable storage medium for storing instructions, such that the at least one processor is programmed to:
       receive the at least one input signal from the at least one input device;
       determine a current tire state and a current tire prediction model;
       compare the current tire state and the current tire prediction model to the data indicative of the motion of the vehicle in response to the at least one processor receiving the at least one input signal;

calculate in real-time an adjusted tire state and an adjusted tire prediction model based on the data indicative of the motion of the vehicle in response to the at least one processor determining that the current tire state and the current tire prediction model are not verified against the data indicative of the motion of the vehicle; and generate in real-time at least one actuation signal based on the adjusted tire state and the adjusted tire prediction model; and wherein the at least one actuator in real-time adjusts the motion of the vehicle in response to the at least one actuator receiving the at least one actuation signal from the at least one processor.

12. The computer of claim 11 wherein the at least one processor is further programmed to:

compare a first sign of the current tire state and a second sign of a current tire lateral force to one another;

determine a degradation in at least one of the current tire state and the current tire prediction model in response to the at least one processor determining that the first and second signs are opposite to one another; and calculate in real-time the adjusted tire state and the adjusted tire prediction model in response to the at least one processor determining the degradation in the current tire prediction model.

13. The computer of claim 12 wherein the at least one processor is further programmed to:

determine an increase in a tire slip ratio of the vehicle in response to the at least one processor receiving the at least one input signal from the at least one input device;

determine an increase in a tire lateral force capacity in response to the at least one processor determining the increase in the tire slip ratio; and determine the degradation in at least one of the current tire state and the current tire prediction model in response to the at least one processor determining the increase in the tire lateral force capacity.

14. The computer of claim 13 wherein the at least one processor is further programmed to:

determine an increase in a current tire normal force in response to the at least one processor receiving the at least one input signal from the at least one input device; and determine the decrease in the tire lateral force capacity in response to the at least one processor determining the increase in the current tire normal force.

15. The computer of claim 14 wherein the at least one processor is further programmed to use an Arbitration logic to calculate the adjusted tire state and the adjusted tire prediction model in response to the at least one processor determining that the current tire state and the current tire prediction model are not verified against the data indicative of the motion of the vehicle.

16. The computer of claim 15 wherein the at least one processor is further programmed to:

determine offline a decrease in a first torque in a front axle for a predetermined period of time below a time threshold; and determine offline the degradation in the current tire state and the associated data indicative of the motion of the vehicle in response to the at least one processor determining the decrease in the first torque in the front axle.

17. A method for operating a computer for a vehicle motion control system of a vehicle, the method comprising:

receiving, using at least one processor of the computer, at least one input signal from at least one input device associated with data indicative of a motion of the vehicle;

determining, using the at least one processor, a current tire state and a current tire prediction model;

comparing, using the at least one processor, the current tire state and the current tire prediction model to the data indicative of the motion of the vehicle in response to the at least one processor receiving the at least one input signal;

calculating, using the at least one processor, in real-time an adjusted tire state and an adjusted tire prediction model based on the data indicative of the motion of the vehicle in response to the at least one processor determining that the current tire state and the current tire prediction model are not verified against the data indicative of the motion of the vehicle; and generating, using the at least one processor, in real-time at least one actuation signal based on the adjusted tire state and the adjusted tire prediction model; and wherein the at least one actuator in real-time adjusts the motion of the vehicle in response to the at least one actuator receiving the at least one actuation signal from the at least one processor.

18. The method of claim 17 further comprising:

comparing, using the at least one processor, a first sign of the current tire state and a second sign of a current tire lateral force to one another;

determining, using the at least one processor, a degradation in at least one of the current tire state and the current tire prediction model in response to the at least one processor determining that the first and second signs are opposite to one another; and calculating, using the at least one processor, in real-time the adjusted tire state and the adjusted tire prediction model in response to the at least one processor determining the degradation in the current tire prediction model.

19. The method of claim 18 further comprising:

determining, using the at least one processor, an increase in a tire slip ratio of the vehicle in response to the at least one processor receiving the at least one input signal from the at least one input device;

determining, using the at least one processor, an increase in a tire lateral force capacity in response to the at least one processor determining the increase in the tire slip ratio; and determining, using the at least one processor, the degradation in at least one of the current tire state and the current tire prediction model in response to the at least one processor determining the increase in the tire lateral force capacity.

20. The method of claim 19 further comprising:

determining, using the at least one processor, an increase in a current tire normal force in response to the at least one processor receiving the at least one input signal from the at least one input device; and determining, using the at least one processor, the decrease in the tire lateral force capacity in response to the at least one processor determining the increase in the current tire normal force.

* * * * *